May 26, 1953 A. KIENAST 2,640,188

CONTROL PULSE DISTRIBUTING SYSTEM

Filed Dec. 20, 1949 2 Sheets-Sheet 1

INVENTOR.
ALFRED KIENAST
BY Ralph W. Bumstead
ATTORNEY

May 26, 1953 A. KIENAST 2,640,188

CONTROL PULSE DISTRIBUTING SYSTEM

Filed Dec. 20, 1949 2 Sheets-Sheet 2

INVENTOR.
ALFRED KIENAST

BY Ralph W. Bumstead

ATTORNEY

Patented May 26, 1953

2,640,188

UNITED STATES PATENT OFFICE 2,640,188

CONTROL PULSE DISTRIBUTING SYSTEM

Alfred Kienast, Kuesnacht, Switzerland

Application December 20, 1949, Serial No. 134,033
In Switzerland June 1, 1949

9 Claims. (Cl. 340—147)

The present invention relates to automatic switching circuits inclusive of the means to operate them and more particularly to systems employing two sequences of electrical pulses each occurring in the space intervals of the other sequence.

Heretofore it has been common practice in signaling to transmit positive and negative pulses alternately over a single line either for purposes of intelligence communication, or for remote control of a given device or devices, such as switches, registers and the like. For example, consider Patent 1,890,878, granted December 13, 1932, to Haselton et al. In Fig. 3 of that patent there is shown a graph of signaling pulses wherein the positive half-cycles are sometimes, but not always interspersed with negative half-cycles. That method of signaling, however useful it may have been in the device of the patent, would be entirely unsuited to the requirements of my invention.

The main object of this invention is to provide means for the employment of two sequences of pulses, pulses of one sequence each occurring in the space interval between two pulses of the other sequence. Such means is, further, to be so designed that each pulse of one sequence prepares a path for the next pulse of the other sequence. Therefore, the two sequences are mutually interdependent and may be called interlaced or linked sequences of pulses.

A more specific object of the invention is generation and use of two interlaced sequences of pulses each occurring in the space intervals of the other, the path of each pulse sequence being different from the path of the next.

A further object of the invention is to provide means to generate such sequences of pulses.

Still further objects of the invention are to provide switching equipment in which, among other advantageous features, the following improvements are incorporated:

(1) Means for more efficient use of signaling time.

(2) In an automatic equipment for every pulse a path is provided different from those of the next succeeding and next preceding pulses.

(3) The path for each of the pulses is interrupted after the pulse has ceased to exist and therefore there are no sparking contacts in the circuits except possibly those in the pulse generator.

(4) In an automatic equipment the problems of programming and handling the required changes in the circuit connections admit of relatively simple solutions and thereby the possibility of disturbances is decreased.

Figures 1, 2, 3:
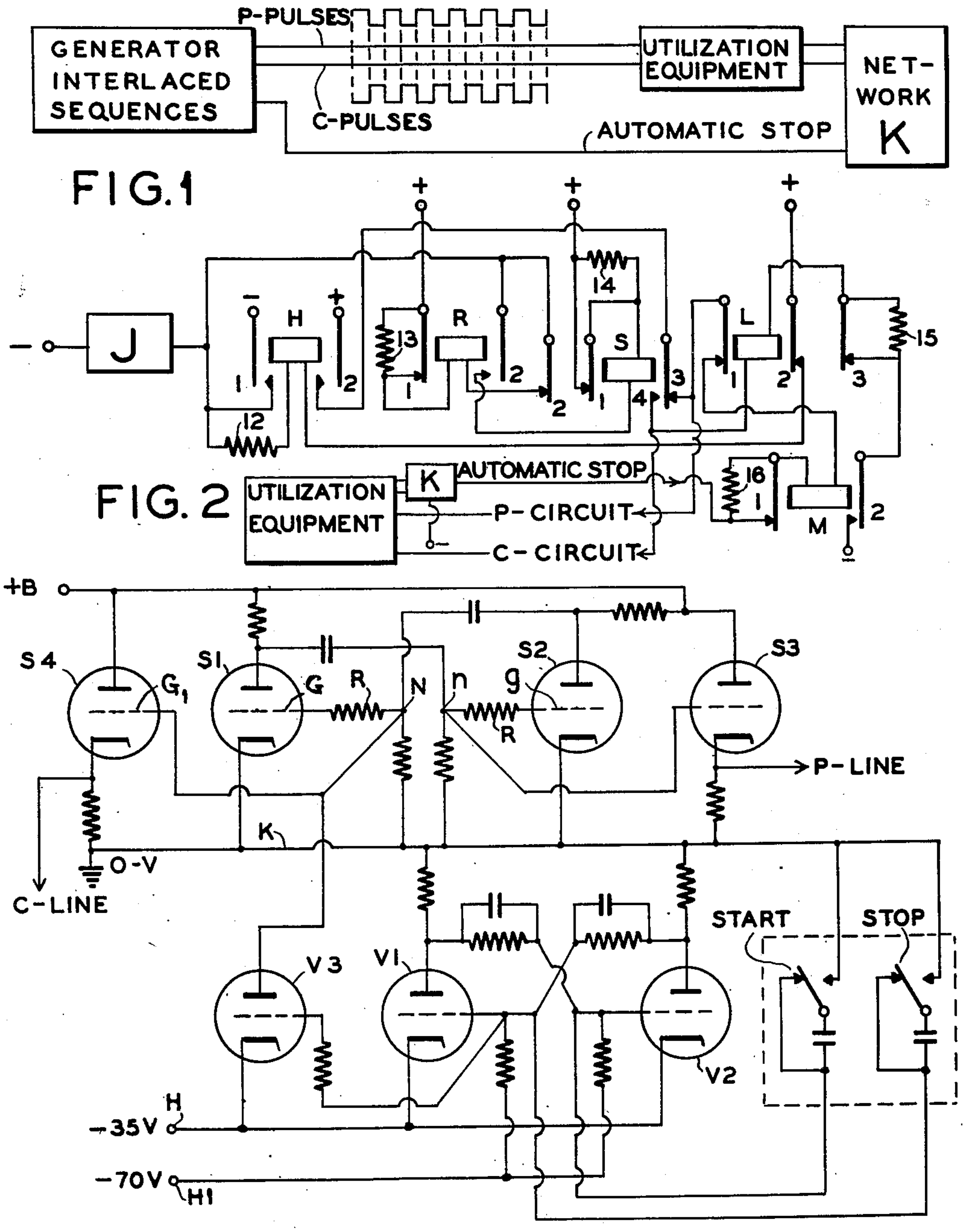
Figure 1 represents a block diagram of a possible arrangement of an automatic system using two interlaced sequences.
Figure 2 represents a circuit diagram showing a pulse generator using relays, hereinafter called a relay oscillator, with circuits for automatically starting and stopping operation.
Figure 3 represents a multi-vibrator serving as pulse generator, pulsing tubes S3 and S4 and circuits for automatically starting and stopping operation.

The system herein disclosed uses two sequences of pulses of equal duration, preferably, but not necessarily, of like polarity, the path of each pulse being different from the path of the next pulse, each pulse setting up as a part of the switching circuit the path for the next pulse belonging to the other sequence and at the same time cancelling the path of the next preceding pulse of the same sequence.

Since the performance of every pulse according to the plan incorporated in the circuit is dependent upon the fulfillment of the function allotted to the next preceding pulse, the two sequences are not independent; they are interlaced as a consequence of the construction of the switching circuit which they are serving.

A characteristic feature of the system resides in the rule by which a switching circuit of the kind contemplated is constructed. After every step a pulse of the other sequence is available to contribute to the guidance of the system which seems to suffice for all possible purposes.

A circuit of this kind may comprise electromagnetic and/or electronic parts. A circuit performing prescribed actions using electromechanic or electromagnetic means can be translated step by step into a circuit using electromagnetic or electronic elements respectively and performing analogous functions. Therefore, the circuit described here enlarges considerably the range of electrical switching.

To cite an example, it is possible, if desired, to replace a circuit based on electromechanic parts depending on connections established by moving brushes over bank terminals, by a circuit in which all connections are established by contacts with the well known advantageous properties. This improvement may be realized in the case of apparatus of the type of electromechanic selector switches by an application of the stepping switch described hereinafter.

The sequences of pulses may be generated by mechanical, electromagnetic or electronic means. This, together with the above mentioned switching means, permits operation at any speed within wide limits, chosen at will to meet stated requirements.

One other kind of improvement deserves special consideration; that is, in the case of a circuit built up with relays, that the majority of contacts close and open either without current or, if there is a current, it is a small holding current.

It will be observed that the present invention may be carried out by the use of either electromagnetic or electronic switching equipment. In either case the interlaced sequences of pulses above referred to may be considered to have two basic and distinctive functions. That is to say, the P-pulses serve to operate a series of devices or elements in orderly succession. The C-pulses, on the other hand, are useful for remote control switching purposes, or to prepare new paths for the P-pulses, so that they may reach different goals of utilization.

The invention is, therefore, conveniently carried out by the transmission of the P-pulses and the C-pulses over respectively different channels, and by limiting the duration of each P-pulse to a space interval between two C-pulses, and vice versa.

Referring now to Fig. 1, I show diagrammatically a signal source labeled "Generator interlaced sequences." There are two outgoing lines which carry the P-pulses and the C-pulses respectively. Over these lines the signals are transmitted to certain responsive devices which are indicated in the block labeled "Utilization equipment" and which will be presently described in more detail. A third line labeled "Automatic stop" may be provided for the purpose of shutting off the pulse generator when a sufficient number of pulses has been transmitted to execute the required functions. The block labeled "Network-K" represents equipment to be automatically controlled and to send back to the generator a stop signal.

Fig. 2 shows how the interlaced pulses may be generated, using a preferred system of relays. The block J represents a control switch operable to start the pulse generator by locking up relay H. The circuit for relay H extends from minus battery first through switch J, but afterwards through contact 1 of relay H (a locking contact), through the winding of this relay, through normally closed contacts 2 of relay L and thence to + battery.

While relay H remains locked up relays R and S operate in alternate succession and in mutual dependence one on the other. Relay R is first energized simultaneously with the locking up of relay H because its operating circuit connection to minus battery is common to that of relay H as above described. Note, however, that resistors 12 and 13 and associated contacts 1 of relays H and R are used to cut down the holding current of these relays after they have been energized, although, as shown, resistor 12 is so connected to the coil of relay H that it is traversed both by the energizing current and the holding current. Contact 1 of relay S and the resistor 14 are comparable in functions to those of resistor 13 and contact 1 of relay R.

The closure of contacts 2 of relay R completes an operating circuit for relay S, this circuit being traced from minus battery through contacts 1 of relay H, contacts 2 of relay R, the coil of relay S and its contacts 1 and thence to + battery. As soon as contacts 1 are opened by the armature attraction of relay S its holding current traverses resistor 14. Its transfer contacts 3, 4 are then effective to terminate the transmission of a P-pulse from contact 3 and to start a C-pulse through contact 4. Contacts 2 of relay S also open and cause the release of relay R. When relay R releases and opens its contacts 2 it causes the release of relay S. Now contacts 2 of relay S again close, so that relay R again energizes. This cycling continues until a stop signal is applied to relay M, coming from network K as a result of having advanced a stepping switch to a certain point where minus battery is connected to the automatic stop line, so called.

The stop signal occurs simultaneously with the final P-pulse. The circuit closure for operating relay M is, therefore made at network K and at the same time at contact 3 of relay S. As soon as relay M energizes, its contact 1 opens so as to place resistor 16 in series with the relay coil. Contact 2 of relay M also closes and causes the actuation of relay L when relay S next operates. Thus upon sending out the final C-pulse, relay L is operated. Its contacts 1 are opened, releasing relay M. Its contacts 2 are also opened, releasing relay H. And finally its contacts 3 are opened so as to cause the holding current for relay L to traverse resistor 15, reducing this holding current so as to minimize sparking at the break contacts 2 of relay M and 4 of relay S. Since relay H has now been released, the entire circuit arrangement of Fig. 2 is restored to normal. Further pulse generation can be resumed only upon actuating switch J.

It will be appreciated by those skilled in the art that the cyclic operation of relays R and S in the manner above described, and in mutual dependence one upon the other, is characterized by a natural cadence of the cycles which results from the magnetic characteristics of the relays and from the transit times of their armature movements, and from the stiffness and/or resilience of the contact springs of these relays. Furthermore, it is well known that adjustments of spring tensions and other parameters of relay design can be made so as to produce a desirable cadence of pulse output within workable limits. And, because the transfer contact of relay S swings between the back contact 3 and the front contact 4 in order to deliver the P-pulses and the C-pulses respectively, it is impossible to cause any overlap of the pulses in the two signaling lines. The interlacing of these pulses is, therefore, performed in a manner suited to the practical needs of the invention.

*Multivibrator means for pulse generation*

Fig. 3 shows an electronic multivibrator circuit arrangement which may be employed in place of the relay switching arrangement of Fig. 2 and which will serve equally well, or better, to supply the interlaced P-pulses and C-pulses. The circuit arrangement for cross-coupling between the anode of tube S1 and the grid of tube S2, also between the anode of tube S2 and the grid of tube S1 will be recognized as conventional and needing no lengthy explanation. By suitable choice of circuit parameters the multivibrator may be set to oscillate at a desired frequency, since the cross-connections possess reactance and are symmetrical.

The cathode follower tube S3 has its grid connected to junction point *n* in the R-C circuit between the anode of tube S1 and the grid of tube S2. A similar cathode follower tube S4 has its grid connected to junction point N in the R-C circuit between the anode of tube S2 and the grid of tube S1. Thus, if tube S3 when driven conductive delivers the P-pulses, then the similar cathode follower tube S4 may be used to deliver the C-pulses. These P-pulses and C-pulses, considered as being positive with respect to ground are not overlapping, but each is timed to be delivered during the space interval of the other.

A start switch and a stop switch are shown in Fig. 3 to have normally short-circuited condensers connected respectively to the grids of two triodes V1 and V2, these triodes constituting a trigger pair. When one or the other of these switches is operated, its associated condenser provides a path for a surge pulse from ground (conductor K) to the appropriate grid in these triodes.

The duration of the start pulse or of the stop pulse is limited by the value of the condenser through which the pulse passes. It is sufficient, however, to trigger the flip-flop circuit V1—V2 to one or the other of its stable states. The start pulse makes tube V2 conductive and this in turn controls the grids in tubes V1 and V3 so as to bias them to cut-off. While tube V3 is non-conductive it has no effect on the multivibrator to unbalance its vibratory characteristics. The anode in tube V3 is maintained at the varying potential of junction point N, thus enabling the grid of tube S1 to be controlled by the variable anode potential of tube S2.

Now in order to explain how the stop switch as shown in Fig. 3 can be made to interrupt the generation of oscillations by the multivibrator, let it be assumed that with respect to the grounded lead K the voltage of lead H is —35 v. and the voltage of lead H1 is —70. Other voltages may be chosen, but these are sufficient to indicate satisfactory operability, merely by way of example.

The surge pulse which is initiated by the stop switch and which goes through the associated condenser drives tube V1 conductive. The stable state of the trigger pair is established when tube V2 is made non-conductive and causes tube V3 to be held conductive. Conduction in this tube produces a potential drop in the grid resistor that is connected between ground and junction point N, so that the grid bias applied to tube S1 causes this tube to be held non-conductive. Therefore, the multivibrator can no longer oscillate.

*The stepping switch, relay type*

Figure 4:
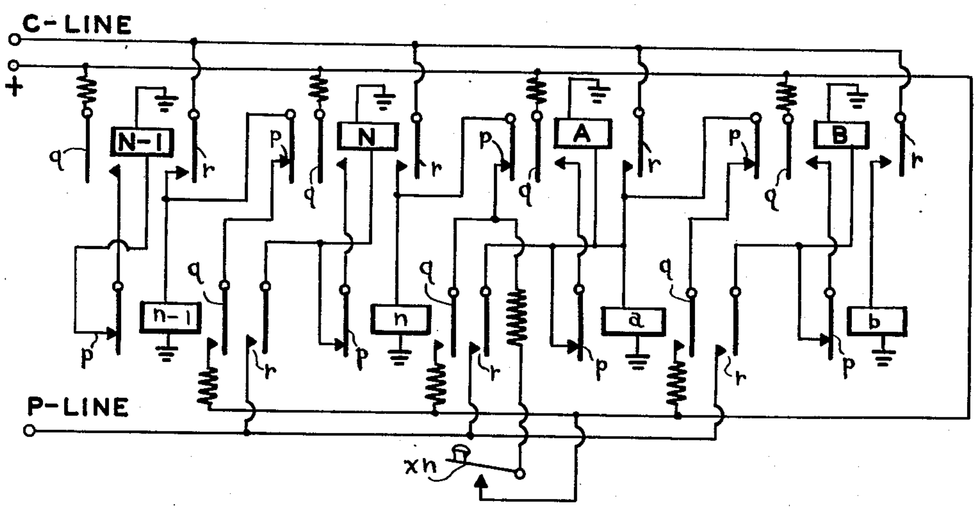
Figure 4 shows a stepping device composed of relays and a diagram of contacts to be used for sending sequences of pulses.

In Fig. 4 there is shown a relay chain which is designed to operate as a stepping switch. It is the electrical analogue of a "ratchet-and-pawl" movement. It may be operated in continuous cycles, if desired, under control of interlaced stepping pulses as received on the incoming P-line and C-line respectively.

For each stage of progression two relays are provided. Relays referenced by capital letters A, B, N–1, and N are actuated by P-pulses. The mates to these relays are labeled *a*, *b*, *n*–1, and *n*, they being actuated by C-pulses. Any number of relay pairs may be assumed to be interposed in the closed-circle chain between the pair B, *b* and the pair N–1, *n*–1. Local power for actuating the relays is applied over a feeder line marked +. The return circuit to the minus terminal of the power source is indicated by the ground symbol as applied to one terminal of each relay coil. Each relay has one set of break contacts *p* and two sets of make contacts *q* and *r*. In practical applications of this stepping switch additional contacts will be presumed to be provided, so as to perform useful functions. These are not shown or described because they do not affect the operation of the switch itself.

The closure of a start key *xn* is a necessary preliminary to the conditioning of the relay chain for response to stepping signals, since at the outset the signal lines have no access to any of the relays. The start key may be manually operated or remotely controlled. It operates relay *n*, feeding + potential from the key to contact *p* on relay A, and thence to the coil of relay *n* and to ground. A self-locking circuit for relay *n* extends from the + source through a resistor, through locking contacts *q* of relay *n*, through unlocking contacts *p* of relay A, and thence through the coil of relay *n* to ground.

Relay *n*, upon operation, prepares a path from the P-line to relay A. So the next P-pulse operates relay A with the result that this relay opens its break contacts *p* to release relay *n*. Relay A now locks up through its own locking contacts *q* and through unlocking contacts *p* of relay *a*. Closure of contacts *r* on relay A prepares a path for relay *a* to respond to a C-pulse. The energized state of relay A persists until the start of the next C-pulse. At that moment relay *a* operates, opening its unlocking contacts *p* for the release of relay A.

A holding circuit for relay *a* extends from the + source through locking contacts *q* of relay *a* and through unlocking contacts *p* of relay B and thence through the coil of relay *a*. Through contacts *r* of relay *a* a path is prepared for the next P-pulse to operate relay B.

In like manner, according to the above description, successive pairs of relays are operated by successive P-pulses and C-pulses. The relay chain may, of course, be endless, as indicated by the placing of the N relay ahead of relay A, and the N–1 relay ahead of the N relay in the circuit diagram.

In Fig. 5*a* network is shown which comprises 8 pairs of relays A—B, D—E, . . . H—M and analogues thereof. From each pair emerges a pair of lines S1—T1, S2—T2, . . . S8—T8 and at the end there is a separate pair S9—T9. The entire series of pairs of lines S1—T1, S2—T2, . . . S9—T9 will hereafter be referred to collectively as line pairs S*k*—T*k*. The interlaced sequence of pulses entering over P-line and C-line is distributed in such manner that the first pair of a P-pulse and the following C-pulse appears on all the outgoing pairs of lines S*k*—T*k*; the second pair of a P-pulse and the following C-pulse appears on all pairs S*k*—T*k* except the first one; the third pair of a P-pulse and the following C-pulse appears on all pairs S*k*—T*k* except the first and the second and so on until the ninth pair of a P-pulse and the following C-pulse appears on the last pair of lines S9—T9. In other words: The distribution is such that on the pair of lines S*k*—T*k* there appears a sequence of exactly *k* pairs of interlaced pulses.

Each of the relay pairs A—B; D—E, . . . H—M, is possessed of a set of make-before-break contacts such as *b*—*c*, *g*—*h*, etc., and a set of transfer contacts such as *a*, *d*, *i*, etc. Relay X is provided for conditioning the circuit device to respond to a train of interlaced P-pulses and C-pulses. Relay Y is provided for response when the circuit device has gone through one switching cycle. Relay Y prepares a path for P-pulses to be extended to another section of the apparatus, and also for conditioning a relay Z to respond to the next P-pulse and be locked up. Relay Z switches the C-line to a C-extension. Relay W is operated from another section and unlocks relays Y and Z.

Figure 5:
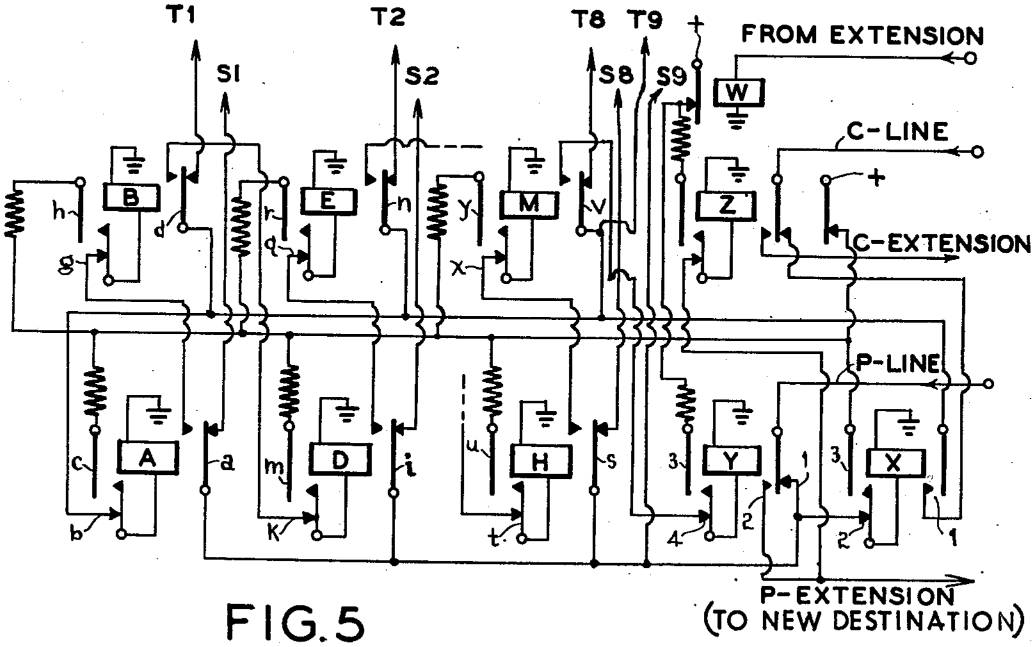
Figure 5 represents a circuit diagram of a distributor.

Prior to reception of a train of signal pulses the circuit device of Fig. 5 stands with none of its relays operated. So the contacts of these relays stand in the positions shown in the diagram. From the remote control point an interlaced pulse train is initiated. The first P-pulse in such a train is effective in energizing relay X, causing it to be locked up by + potential through its locking contact 3. Closure of its contacts 1 causes the C-line to be connected to contact *b* of relay A and to all of the out-going utilization circuits T1, T2, etc. (or T*k*). Before the first C-pulse is received, however, the first P-pulse is extended through contact 1 of relay Y to all of the out-going utilization circuits S*k*.

The first received C-pulse causes relay A to be actuated, since the C-line was extended thereto by closure of contacts 1 on relay X. Relay A is locked up through its locking contact *c*, and its transfer contact *a* prepares a path for P-pulse application to relay B.

The second P-pulse causes relay B to be actuated, since this pulse traverses contact *a* of relay A and contact *g* of relay B, thence to the coil of relay B and ground. Contact *h* of relay B makes before contact *g* breaks, so relay B is locked up for the duration of the pulse train now being considered. For the same duration the out-going utilization circuit T1 is opened, but the transfer contact *d* of relay B now prepares a path for the next C-pulse to reach relay D. The second P-pulse is extended to out-going utilization circuits S2 to S9 inclusive. The S1 line was disconnected by operation of relay A. Now relay D responds to the second C-pulse and locks up. It prepares a path for relay E to respond to the next P-pulse and also disconnects out-going utilization circuit S2.

Now the distribution of pulses proceeds in the same manner as above described, one after another of the out-going utilization circuits S*k* and T*k* being dropped out successively. When the pulse train has advanced to the extent that relays H and M have been locked up, it will be apparent that only the utilization circuits S9 and T9 will receive a P-pulse and a C-pulse respectively. Relay M has now prepared a path so that relay Y will respond to the next C-pulse. Relay Y then responds to that pulse by extending the P-line through its contact 2 to an outgoing line labeled "P-extension (to new destination)." Relay Z is also operated and locked up, the result being to extend the C-line to the outgoing "C-extension," and also to disconnect the local + terminal of the power source from the locking circuits of all the relays A, B, D, E, etc., H, M and X. By this disconnection, therefore, the relay circuit as above described is restored to normal, except for fact that relays Y and Z remain locked up so that subsequent trains of interlaced signals may be passed along to other sections of the equipment, as located outside of the circuit shown in Fig. 5, but possibly of similar construction.

It will be understood by those skilled in the art that I may employ any suitable means for unlocking the relays Y and Z and may perform the unlocking operation at a time which is favorable to the exercise of other functions with which this invention is only indirectly concerned. Obviously a pair of relay-controlled break contacts may be inserted in the line which is connected (Fig. 5) between the + terminal and the resistive holding circuits for relays Y and Z. The apparatus to which it is contemplated extending the P-line and the C-line can only be controlled if the Y-relay and the Z-relay remain locked up until after that apparatus has had time to operate.

The assumed unlocking operation by a relay W shown in Fig. 5 is, therefore, a matter of conventional technique which pertains more particularly to the associated apparatus at the so-called "new destination," and is subject to control from that point. No details of that associated apparatus are deemed to be essential to a full disclosure of the instant invention because they appear to be beyond the scope of the invention itself.

As an example of holding circuit and unlocking circuit techniques U. S. Patent 2,103,296, granted December 28, 1937, to Nelson et al. is referred to. On page 5, second column of that patent there is a full description of certain relay circuits which are used in the system of the patentees for sequential operation of switching functions, including the proper timing of locking and un-locking means.

With reference to the assumed utilization device to which the branch circuits S1—S9 and T1—T9 may be extended, it is sufficient to explain that such a utilization device makes use of different trains of pulses as applied to the several pairs of branch circuits. The pair S1, T1 receives one pulse during a given cycle of my distributor switch. The pair S2, T2 receives two pulses; pairs S*k*, T*k* receive more and more pulses, and pair S9, T9 receive nine pulses. These pulses may, for example, serve to advance the counting wheels of an adding machine by different amounts, depending upon how the circuits S*k*, T*k* are selected to control the counting wheels in different denominational positions of the machine. The manner of making such selections is, however, beyond the scope of this invention. All that is required in this case is that my distributor switch when it cycles must be caused to go fully through each cycle before it is released. And if multiples of the apparatus controlled during one cycle are to be served at a "new destination," then the unlocking of relays Y and Z will be delayed for that purpose until all cycles have been completed.

It will be apparent to those skilled in the art that my invention is capable of adaptation to the needs of various telemetering systems, calculating machines, remote control devices and communications networks. The circuit arrangements herein shown and described are illustrative of what may be used as embodiments of my invention. The invention itself, however, is to be understood as limited in scope only as defined by the claims.

I claim:

1. A signal-controlled switching arrangement comprising two lines P and C extending between a control station and a station having equipment to be sequentially controlled, means for causing a predetermined number of discrete pulses to be transmitted over the P-line and for causing the same number of discrete pulses to be transmitted over the C-line in interlaced time relation to the first said pulses, a plurality of paired relays each having make-before-break contacts and transfer contacts, a locking circuit closeable by each relay through its own winding and through its own set of make-before-break contacts, relay means for starting a progressive response to pulses delivered via the C-line, this response being characterized in that after the first pulse delivered via the P-line actuates said relay means the C-line is extended simultaneously to a plurality of branch circuits whereby said equipment is sequentially controlled, and is also extended to the winding of a certain relay of a pair designated as the first to be operated in the series, the operation of this relay being effective to prepare a circuit through its transfer contacts whereby its companion relay is made receptive to the next following pulse delivered via the P-line, and at the same time one of a series of P-line branch circuits is opened, these branch circuits, like the branch circuits first mentioned, being also useful for sequential control of said equipment, said companion relay when operated being effective to close its own locking circuit, to open one of the C-line branch circuits, and to make another relay receptive to the next following C-line pulse, the chain of pulse responses being continued in like manner until all of said branch circuits have been opened, means thereafter operative in response to a C-line pulse for extending the P-line to a new destination, for disconnecting that line from its branch circuits to said equipment and for preparing a cycle-terminating relay to operate, and means including the last mentioned relay for opening all locking circuits of said paired relays, thereby to restore said switching arrangement to normal.

2. In an electric signaling system, two lines C and P, a plurality of local circuits, relay means for simultaneously connecting all of said circuits to line C, and means stepwise operable by pulses transmitted over line P to disconnect one after another of said circuits from line C.

3. The combination according to claim 2 and including a second plurality of local circuits normally connected to line P, and means stepwise operable by pulses transmitted over line C to disconnect one after another of these last mentioned circuits from line P.

4. The combination according to claim 3 and including two extension lines and relay means operable in response to a succession of interlaced pulses transmitted over lines C and P for establishing connection between line P and one of said extension lines, also between line C and the other of said extension lines.

5. A relay type distributor having local circuits to be switched on and off, being normally connected to a P-line, and other local circuits normally interconnected with each other through a stand-by conductor which is connectable to a C-line, pulse supply means at a remote point for feeding interlaced pulse trains over said lines, means responsive to an initial pulse transmitted over the P-line for connecting said stand-by conductor to the C-line, said distributor comprising a series of relay pairs one relay of each pair being responsive to a predetermined pulse of the C-line train and being arranged to prepare a circuit to its paired relay thereby to render it responsive to the next following pulse of the P-line train, transfer contacts on each of said P-line pulse responsive relays for preparing a circuit which enables another relay to respond to the next following C-line pulse, the contact arrangement of said relays being such that as successive pairs of relays are operated, different ones of said local circuits are progressively disconnected from said stand-by conductor and from said P-line respectively.

6. A device according to claim 5 wherein said pulse supply means is constituted as an electronic multivibrator.

7. A device according to claim 6 wherein said multivibrator is arranged and adapted to deliver discrete pulses to each of said lines and to avoid overlap of pulse transmission times as between the C-pulses and the P-pulses, so that circuit switching under control of the C-pulse responsive relays is accomplished during space intervals between the P-line pulses and vice versa.

8. In a device of the class described, an array of relays each having a winding terminal connected to one pole of a direct current source, a pulse transmitter energized from the other pole of said source, two distinct line conductors fed with pulse energy from said transmitter, one of said line conductors being connectable to the opposed winding terminal of odd numbered relays of said array and the other of said line conductors being connectable to the opposed terminal of even numbered relays of said array, means in said transmitter for impressing a chosen number of non-overlapping pulses of a pulse train on said line conductors in interlaced sequence so that the pulses carried by one conductor occur during space intervals between pulses carried by the other conductor, each of said relays being operable only in response to a single pulse of said train, each relay having a self-locking circuit with operatively associated make-before-break contacts, and transfer contact means whereby each relay upon operation prepares a path for successive operation of the relay next in order, and a plurality of utilization circuits each initially and normally connected to one or the other of said line conductors through a respective pair of contacts in said transfer contact means, said utilization circuits being operable in orderly sequence in accordance with the successive operation of said relays.

9. A control pulse distributing system having relays under control of interlaced pulses transmitted thereto over two conductors, the pulses carried by one of said conductors occurring during space intervals between pulses carried by the other said conductor, said relays being of two series, means including make-before-break contacts operable by each relay for producing successive single relay operations in response to said transmitted pulses, each operation of a relay being effective to prepare a control path for sequential operation of a relay of the other series, a plurality of branch circuits all initially connectable to one of said conductors, a corresponding plurality of branch circuits all initially connectable to the other of said conductors, and break-contacts operable by said relays for causing said branch circuits to be individually opened upon reception of each successive pulse, whereby the number of pulses carried to the branch circuits by each conductor is progressively incremented until the maximum number of pulses is applied to the two branches last to be open-circuited.

ALFRED KIENAST.

References Cited in the file of this patent

UNITED STATES PATENTS

| Number | Name | Date |
|---|---|---|
| 1,890,877 | Haselton | Dec. 13, 1932 |
| 1,890,878 | Haselton et al. | Dec. 13, 1932 |
| 1,957,672 | Saunders | May 8, 1934 |
| 2,053,749 | Steeneck | Sept. 8, 1936 |
| 2,067,151 | Dicke | Jan. 5, 1937 |
| 2,103,296 | Nelson et al. | Dec. 28, 1937 |
| 2,314,187 | Abbott | Mar. 16, 1943 |